(12) United States Patent
Casper et al.

(10) Patent No.: US 7,165,665 B2
(45) Date of Patent: Jan. 23, 2007

(54) TRANSFER LINE FOR TRANSPORTING WORKPIECES

(75) Inventors: Jürgen Casper, Möglingen (DE); Klaus Strohhäcker, Ludwigsburg (DE); Thomas Schlegel, Kirchheim (DE)

(73) Assignee: Cross Hüller GmbH (DE)

( * ) Notice: Subject to any disclaimer, the term of this patent is extended or adjusted under 35 U.S.C. 154(b) by 0 days.

(21) Appl. No.: 11/143,366

(22) Filed: Jun. 2, 2005

(65) Prior Publication Data

US 2005/0274587 A1   Dec. 15, 2005

(30) Foreign Application Priority Data

Jun. 12, 2004   (DE) .................... 10 2004 028 596

(51) Int. Cl.
  *B65G 37/00*   (2006.01)
  *B65G 17/00*   (2006.01)
(52) U.S. Cl. ................ 198/346.3; 198/346.1; 198/468.01; 198/468.6; 198/750.1; 198/750.14; 414/591; 414/749.1; 72/405.11; 72/405.16
(58) Field of Classification Search ......... 198/346.1, 198/346.3, 468.01, 468.6, 750.1, 750.14; 414/749.1, 591; 72/405.11, 405.16
See application file for complete search history.

(56) References Cited

U.S. PATENT DOCUMENTS 2,899,043 A * 8/1959 Young .................... 198/464.1
3,854,889 A * 12/1974 Lemelson ................. 29/33 P
4,270,655 A   6/1981 Noe
4,669,607 A * 6/1987 Mason ................... 198/774.1
4,730,722 A   3/1988 Sandrock
6,185,979 B1 * 2/2001 Schollhammer ......... 72/405.16
6,688,840 B1 * 2/2004 Hirasawa ............... 414/222.13
2002/0162728 A1 * 11/2002 Hirasawa ................ 198/465.1

FOREIGN PATENT DOCUMENTS

DE   28 09 955 A1   9/1979
GB   2 057 996 A    4/1981
WO   WO 03/086699 A1   10/2003

* cited by examiner

*Primary Examiner*—Gene O. Crawford
*Assistant Examiner*—Leslie A. Nicholson, III
(74) *Attorney, Agent, or Firm*—McGlew & Tuttle, PC

(57) ABSTRACT

A transfer line for transporting workpieces from a first workstation to an adjacent second workstation comprises a frame with a depositing place for at least one workpiece. It further comprises a transporting beam, each end area of which having respective work supports. The transporting beam is supported for height adjustment between two positions of lifting such that the work supports are located above or below the depositing place. The transporting beam is further designed for longitudinal displacement between positions of transfer for the work supports to coincide horizontally with the depositing place.

7 Claims, 2 Drawing Sheets

TRANSFER LINE FOR TRANSPORTING WORKPIECES

BACKGROUND OF THE INVENTION

1. Field of the Invention

The invention relates to a transfer line for transporting workpieces from a first workstation to an adjacent second workstation.

2. Background Art

As a rule transfer lines comprise a plurality of individual workstations which serve for working the same or different types of workpieces. The respective workstation is designed for a given treatment of a workpiece.

WO 03/086699 A1 teaches a transporting arrangement of the generic type which comprises a frame that is to be disposed in front of, and centrally between, two adjacent workstations. A transporting beam is longitudinally displaceably supported on the frame, with a workpiece holding skid being disposed on the transporting beam for displacement over the length thereof. For transfer of a workpiece from one workstation to an adjacent workstation, the transporting beam, by its end that adjoins the first workstation, is moved in front thereof and the workpiece holding skid is moved there too. Then the workpiece is placed on and afterwards the transporting beam is moved by its other end in front of the second workstation. The workpiece holding skid is moved together with the workpiece into this position so that the workpiece is located in front of the second workstation. This design has the drawback of being comparatively complicated constructionally, there being no possibility of inspection of the phases of operation performed on the first workstation.

SUMMARY OF THE INVENTION

It is an object of the invention to embody a transfer line of the generic type which is of constructionally simple and thus solid design, allowing inspections of the workpieces between the phases of operation.

According to the invention, this object is attained in a transfer line with a transporting arrangement, comprising a respective working place at each workstation, the working places having a distance a from each other; a frame to be disposed in front of, and centrally between, the workstations, the frame comprising a depositing place for at least one workpiece; and a transporting beam, which comprises two end areas with a first work support and, at a center distance b therefrom, a second work support, with a $\leq 2b$ applying, and which is mounted on the frame for height adjustment between a first position of lifting and a second position of lifting such that the work supports are located above or below the depositing place, and which is longitudinally displaceable between a first position of transfer and a second position of transfer for the first or the second work support to coincide horizontally with the depositing place. The measures according to the invention help create a simple, compact and thus low-cost transfer line. The transporting beam picks up the workpiece in front of a workstation, transfers it to a depositing place where it deposits the workpiece, resumes its original position, is being lifted and then transfers the workpiece to the next workstation. The motion of transfer is divided into two steps, because the workpiece is deposited halfway on the depositing place. This is where it can be inspected either visually or by automatic inspection devices.

Further developments which involve the solidity of design reside in that transporting beam is supported for horizontal displacement in a lifting skid; in that the transporting beam is horizontally displaceable by a transporting drive; in that the transporting drive comprises a servomotor which is disposed on the lifting skid and a rack which is mounted on the transporting beam and which a pinion of the servomotor engages with; in that the lifting skid is vertically displaceable by a lifting drive which is mounted on the frame; in that the lifting drive comprises a servomotor; and in that the depositing place is comprised of at least two depositing surfaces which are disposed on both sides of the transporting beam, forming a joint horizontal surface. A very simple way of how to control the transporting motion is put into practice by the drives being provided with position transmitters.

Further features, advantages and details of the invention will become apparent from the ensuing description of an exemplary embodiment, taken in conjunction with the drawing.

DESCRIPTION OF A PREFERRED EMBODIMENT

Figure 1:
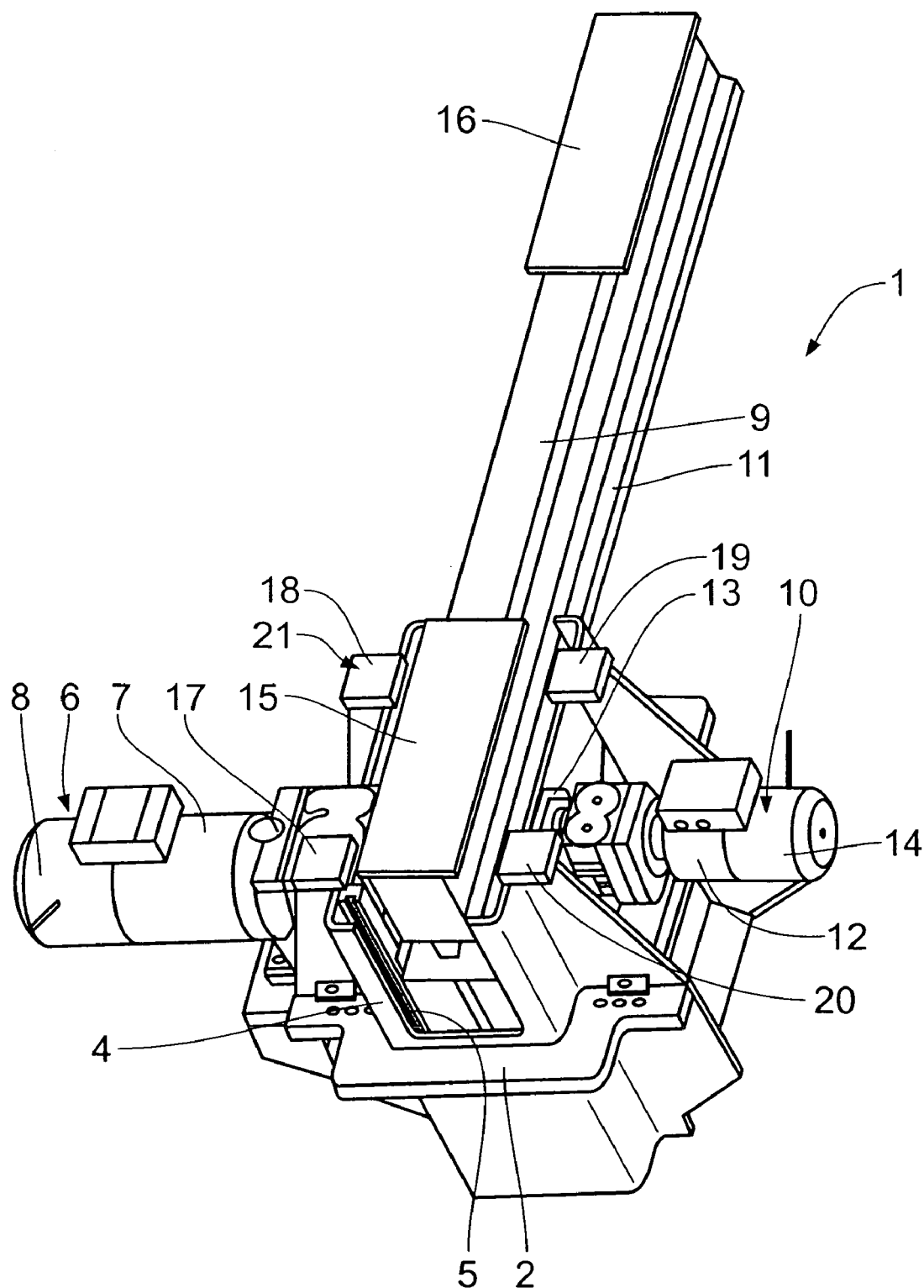
FIG. 1 is a perspective view of a transporting arrangement for a transfer line according to the invention.

The transporting arrangement 1 seen in the drawing comprises a frame 2. On the frame 2, a vertically displaceable lifting skid 5 is guided by a vertical guide 4. By means of a lifting drive 6, the lifting skid 5 is vertically movable in the vertical guide 4. The lifting drive 6 is comprised of a servomotor 7 with a conventional position transmitter 8 which transmits the absolute position of height of the lifting skid 5 as a signal to a control system (not shown).

A transporting beam 9 is mounted in the lifting skid 5 for displacement in the horizontal direction. The transporting beam 9 is horizontally displaceable by means of a transporting drive 10. The drive 10 comprises a rack 11 which is mounted on the transporting beam 9 in the longitudinal direction thereof and which a pinion 13 engages with that is drivable by a servomotor 12. The servomotor 12 is also provided with a position transmitter 14 which detects the absolute position of the transporting beam 9 and transmits it as a signal to the control system (not shown). Two work supports 15 and 16, respectively, are fixed to the two ends of the transporting beam 9 on the top side thereof. A total of four depositing surfaces 17, 18, 19, 20 are mounted on the frame 2 on both sides of the transporting beam 9 at a distance from each other in the longitudinal direction thereof; they lie on a joint horizontal level, jointly constituting a depositing place 21.

The vertical displaceability of the lifting skid 5 is such that the respective work support 15 and 16 can be situated above or below the depositing place 21 formed by the depositing surfaces 17 through 20.

Use and application of the transporting arrangement 1 will become apparent from the diagrammatic illustration of FIGS. 2 to 5.

As illustrated, the transporting arrangement 1 is located in front of, and centrally between, two workstations 22 and 23 i.e., the frame 2 is located in the middle between these two stations 22, 23. The frame 2 supports itself on the adjacent workstations 22 and 23. When a workpiece 24 must be transferred from the workstation 22 to the workstation 23 which is next in the direction of working, then the transporting beam 9, together with its work support 15, is moved in front of the workstation 22, where the workpiece 24 is being placed on the work support 15 in front of the workstation 22 in a manner not shown. The transporting beam 9 is in the described top position of lifting. It is now being moved from the position of transfer according to FIG. 2 into the position of transfer according to FIG. 3, with the work support 15, together with the workpiece 24 deposited thereon, arriving in the position above the depositing place 21. Now the lifting skid 5, together with the transporting beam 9, is being lowered into the bottom position of lifting (not shown in the drawing), whereby the workpiece 24 is being placed on the depositing place 21. The work support 15 located underneath is being freed from the workpiece 24. During this intermediate placement of the workpiece 24 on the depositing place 21, the workpiece can be inspected either visually or by automatic control devices.

Figure 2:
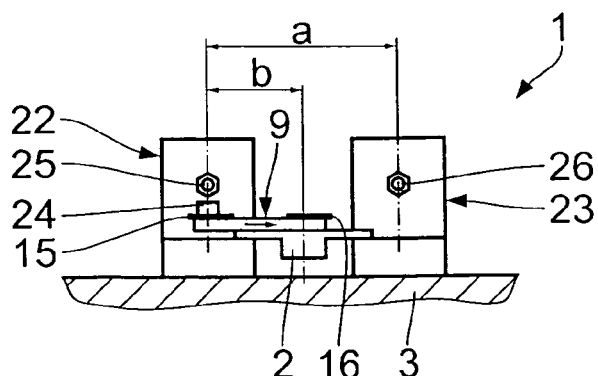
FIGS. 2 to 5 are highly diagrammatic illustrations of the course of a transporting motion upon transfer of a workpiece from a first workstation to an adjacent second workstation.
Figure 3:
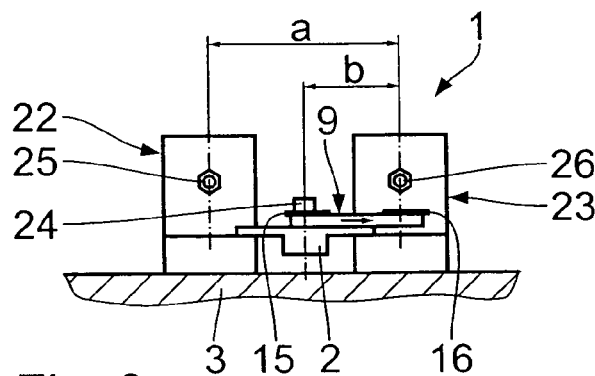
Figure 4:
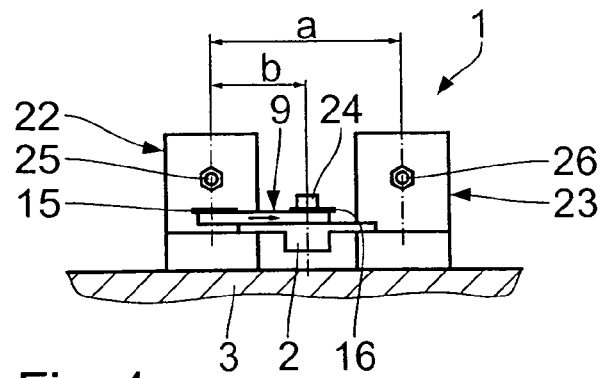
Figure 5:
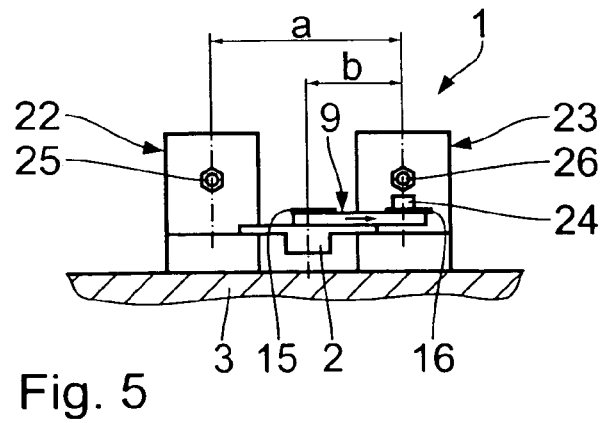

The transporting beam 9 can now be moved again into the position seen in FIG. 4 which corresponds to that of FIG. 2 except that the transporting beam 9 is in its bottom position. Now the transporting beam 9 is moved upwards by corresponding displacement of the lifting skid 5, as a result of which the workpiece 24 is being picked up from below by the work support 16 and lifted off the depositing place 21. Then the transporting beam 9 is again being moved into the position corresponding to FIG. 3, whereby the work support 16, together with the workpiece 24, arrives in front of the workstation 23. Then the workpiece 24 may be appropriately transferred to this workstation 23.

As seen in FIGS. 2 to 5, the working places 25 and 26 of the workstations 22, 23 have a distance a. The two work supports 15, 16 of the transporting beam 9 have a center distance b, with a $\leq 2b$ applying. This means that the maximum distance a of the two working places 25, 26 of the workstations 22, 23 must not exceed twice the center distance b of the work supports 15, 16 on the transporting beam 9 for a workpiece 24 to be able to be transferred, as described, in two steps from one workstation 22 to the next workstation 23. However, the distance a may be less than twice the center distance b. In this case, the transporting beam 9 is not being displaced by its respective maximally possible travel b. The adjacent workstations 22, 23 may have any distance a from each other, the maximum of which only being given by twice the center distance b of the work supports 15, 16.

What is claimed is:

1. A transfer line with a transporting arrangement for transporting workpieces from a first workstation to an adjacent second workstation, comprising
a respective working place at each workstation, the working places having a distance "a" from each other;
a frame disposed in front of, and centrally between, the workstations,
the frame comprising a depositing place for at least one workpiece, which depositing place is located in front of and centrally between the working places;
a transporting beam,
which comprises a first end area with a first work support and, at a center distance "b" therefrom, a second end area with a second work support, with a$\leq$2b applying,
which is mounted on the frame in a lifting skid for height adjustment between a first position of lifting and a second position of lifting in the first position of lifting the first work supports being located above the depositing place and in the second position of lifting the second work support being below the depositing place wherein the lifting skid is vertically displaceable by a lifting drive which is mounted on the frame which lifting drive comprises a first servomotor, and
which is longitudinally displaceable by a transporting drive between a first position of transfer and a second position of transfer for the first or the second work support to coincide horizontally with the depositing place which is comprised of at least two depositing surfaces which are disposed on both sides of the transporting beam, forming a joint horizontal surface and wherein the transporting drive comprises a second servomotor which is disposed on the lifting skid and a rack which is mounted on the transporting beam and which a pinion of the servomotor engages with, and
a first position transmitter of the lifting drive and a second position transmitter of the transporting drive.

2. A transfer arrangement for transporting a workpiece, the arrangement comprising:
a first workstation;
a second workstation spaced from said first workstation by a first distance;
a frame arranged between said workstations, said frame including a depositing place;
a transporting beam movably arranged on said frame in a first direction between a first and second position, said transporting beam having a first end with a first work support, and said transporting beam having a second end with a second work support, said first and second work supports being spaced apart by a second distance, said first distance being less than or equal to twice said second distance,
in said first position of said transporting beam,
said first work support is positioned at said first workstation, and said second
work support is positioned at said depositing place,
in said second position of said transporting beam,
said second work support is positioned at said second workstation, and said
first work support is positioned at said depositing place;
a transporting drive mounted on said frame, and moving said transporting beam in said first direction between said first and second positions,
a lifting skid mounted on said frame movably connecting said transporting beam to said frame in a second direction, said second direction being substantially orthogonal to said first direction.

3. An arrangement in accordance with claim 2, wherein:
said depositing place is comprised of at least two depositing surfaces which are disposed on both sides of said transporting beam.

4. An arrangement in accordance with claim 2, wherein:
said depositing place is arranged substantially centrally between said first and second workstations.

5. An arrangement in accordance with claim 2, wherein:
said depositing place is stationary with said frame.

6. An arrangement in accordance with claim 2, wherein:
said depositing place is comprised of at least two depositing surfaces which are disposed on both sides of said transporting beam; and said depositing place is arranged substantially centrally between said first and second workstations;

said depositing place is stationary with said frame.

7. A transfer arrangement for transporting a workpiece, the arrangement comprising:
a first workstation;
a second workstation spaced from said first workstation by a first distance;
a frame arranged between said workstations, said frame including a depositing place;
a transporting beam movably arranged on said frame in a first direction between a first and second position, said depositing place being comprised of at least two depositing surfaces which are disposed on both sides of said transporting beam, said transporting beam having a first end with a first work support, and said transporting beam having a second end with a second work support,
in said first position of said transporting beam,
said first work support is positioned at said first workstation, and said second
work support is positioned at said depositing place,
in said second position of said transporting beam,
said second work support is positioned at said second workstation, and said
first work support is positioned at said depositing place;
a transporting drive mounted on said frame, and moving said transporting beam in said first direction between said first and second positions,
a lifting skid mounted on said frame movably connecting said transporting beam to said frame in a second direction, said second direction being substantially orthogonal to said first direction.

* * * * *